United States Patent [19]
Broussard

[11] Patent Number: 6,003,571
[45] Date of Patent: Dec. 21, 1999

[54] FLOWER LIKE ROSETTE CUTTING DEVICE

[76] Inventor: Dwayne J. Broussard, 2600 Hwy. 182, Patterson, La. 70392

[21] Appl. No.: 09/163,989

[22] Filed: Sep. 30, 1998

[51] Int. Cl.⁶ .............................. B27C 5/00; B23Q 1/64
[52] U.S. Cl. .................. 144/154; 33/27.07; 74/815; 74/817; 74/813 L; 144/137; 144/144.1; 144/135.2; 144/154.5; 269/57; 269/63; 269/244; 269/247; 409/221; 409/229
[58] Field of Search ...................... 144/134.1, 135.2, 144/137, 144.1, 154, 253.5, 371, 372, 145.2, 286.5, 154.5; 74/813 R, 813 L, 815, 817; 269/55, 56, 57, 64, 67, 69, 58, 63, 240, 244, 247; 409/165, 175, 178, 221, 198, 226, 229; 33/27.07, 27.11

[56] References Cited

U.S. PATENT DOCUMENTS

| | | |
|---|---|---|
| 2,581,415 | 1/1952 | Hull . |
| 2,787,175 | 4/1957 | Schurger . |
| 3,380,322 | 4/1968 | Brault . |
| 3,673,920 | 7/1972 | Wahlen et al. . |
| 4,050,355 | 9/1977 | Niskanen . |
| 4,299,263 | 11/1981 | Skinner ........................ 144/144.1 |
| 4,305,439 | 12/1981 | Skinner . |
| 4,319,615 | 3/1982 | Ditmanson ................... 144/144.1 |
| 4,327,786 | 5/1982 | Markkula . |
| 4,872,792 | 10/1989 | McCubbin . |
| 5,158,125 | 10/1992 | Edwards . |
| 5,271,441 | 12/1993 | Gakhar et al. ............... 144/135.2 |
| 5,586,591 | 12/1996 | Gaydos ........................ 144/145.2 |

*Primary Examiner*—W. Donald Bray
*Attorney, Agent, or Firm*—Garvey, Smith, Nehrbass & Doody LLC

[57] ABSTRACT

A router guide apparatus for use in forming rosette designs in a work piece includes a frame having a work surface with a wheel rotatably mounted upon the work surface. The wheel has a plurality of position stops. The frame includes an adjustable guide for holding and a tracking a router with a cutting blade. The frame includes stops for limiting movement of the router during use. The guide and stops are configured to enable the cutting blade to cut two petals of a rosette design in a single pass. The wheel is affixable into multiple angular positions relative to the guide so that multiple cuts can be made at different angular orientations relative to one another.

28 Claims, 7 Drawing Sheets

FLOWER LIKE ROSETTE CUTTING DEVICE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

The present invention relates to a flower like rosette cutting devices and more particularly to an improved router guide apparatus for use in forming rosette patterns in a wooden or fabrication like workpiece. Even more particularly, the present invention relates to a router guide apparatus for use in forming flower like rosette patterns in a wooden or fabrication like workpiece using a frame having an adjustable guide the includes a side fence for tracking the router along a selected path and adjustable stops for determining the ends of the router path and wherein the stops are positioned at opposite sides of a rotatable wheel that holds the workpiece so that the router can cut through the center of rotation of the wheel and on both sides thereof in a single cut. The wheel is then adjustably moved into different angular positions so that each cut forms two petals of the rosette pattern.

2. General Background of the Invention

Flower like or rosette patterns are typically used in architectural aspects of building such as in the mill work of the interior of homes.

Various millworking devices have been patented that utilize rotary members that rotate relative to fixed base members that carry a workpiece. Some of these woodworking devices cut flower or rosette patterns. An example is U.S. Pat. No. 4,305,439, issued to Charles Skinner and entitled "Woodworking Fixture". The Skinner '439 patent discloses a woodworking fixture for positioning and guiding a workpiece under a stationary routing head, whereby the workpiece is subject a composite movement as it progresses under the routing head. The fixture comprises an indexing table having a clamp for securing the workpiece thereon, mounted on a moveable carriage. The indexing table can be slanted at an adjustable angle and may be routed as the carriage progresses under the routing head in order create designs of varying depth into the workpiece. FIGS. 8 and 9 of the Skinner '439 patent show flower or rosette designs having petals cut into a wooden workpiece.

Other types of fixtures for holding wood are shown in various U.S. patents wherein a rotary table is employed. These includes for example U.S. Pat. No. 2,581,415, entitled "Saw-Setting Machine"; U.S. Pat. No. 2,787,175, entitled "Rotary Machine Tool Table"; U.S. Pat. No. 3,380,322, entitled "Angular Work Indexing Table"; and U.S. Pat. No. 3,673,920, entitled "Apparatus for Cutting Slots or Grooves in Punch Support Plates or the Like".

U.S. Pat. No. 4,050,355 discloses an indexing device for indexing a member, such as a table, into operative work positions in which the table carries follower elements, such as rollers, and cooperating therewith is a drive member mounted on a pair of parallel equal length arms which rotate in unison thereby causing the drive member to take an orbital path. The drive member is slotted and during travel along the orbital path. The drive member is slotted and during travel along the orbital path picks up one of the followers on the table and therethrough causes the table to carry out an indexing movement. The indexing movement of the table is smooth and does not involve movement of the table at excessive speeds.

U.S. Pat. No. 4,327,786, entitled "Work Fixture" discloses a fixture for providing positive control over a workpiece as it is being acted upon by a cutting or finishing tool. A base having a flat working surface is provided with a fixed guide member having a contoured control surface formed along the periphery thereof. A workholder is slidably supported upon the working surface of the base and is arranged to move in abutting contact against the control surface of the guide whereby a prescribed motion is imparted to a workpiece supported in the holder. In one form of the invention, the workholder is mounted upon a turntable that is rotatably supported in a circular guide whereby the work is caused to rotate about a fixed axis.

A pistol grip checkering device is disclosed in U.S. Pat. No. 4,872,792. Also disclosed is pistol grip checkering method, device and product having mill cuts both laterally and longitudinally on the convex face of a pistol grip frame. The cuts are precisely cut by milling machine. A rotatable holder is provided which is pivotable about an axis and which holds the pistol frame to be checkered, such as with a protruding male member inserted into the ammunition magazine receiving chamber within the grip. A supporting surface is provided which is oriented at an angle greater than 90 degrees with respect to the axis and which supports the pistol grip frame. Indexing means are provided to incrementally index the rotatable holder about the axis to provide for successive longitudinal cuts on the convex face of the pistol grip frame.

A carving jig is the subject of U.S. Pat. No. 5,158,125. The carving jig is provided with a base having a bearing in which a projecting spindle is journalled for rotation, the spindle having facilities to allow a workpiece to be attached, either directly or through the provision of an intermediate chuck, the jig also having a flat mounting surface which is normal to the axis of the spindle rotation, and the spindle having an indexing disc attached to it, so that is can be rotated in increments, but restrained against rotation during carving.

The present invention provides a simplified apparatus for guiding a router during the forming of a rosette design or flower design or like pattern in a piece of wood or other fabrication like materials.

BRIEF SUMMARY OF THE INVENTION

The present invention is an improvement over prior art devices because it is simpler, easier to use, and less complex with different design capabilities.

The apparatus of the present invention includes a frame having a work surface, a wheel rotatably mounted upon the work surface, and where in the wheel has a center of rotation and a holder for supporting a workpiece thereon.

The wheel provides a plurality of position stops thereon for affixing the wheel into various positions relative to the frame during use.

The frame includes an adjustable guide for housing and tracking a router with a cutting blade.

The frame includes stops for limiting movement of the router during use. The guide and stops are configured to enable the cutting blade to cut two petals of the rosette or flower design at a time in a single pass.

The wheel is affixable into multiple angular positions relative to the guide, so that multiple cuts can be made at different angular orientations relative to one another for forming the various petals of the design of the flower or rosette pattern.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
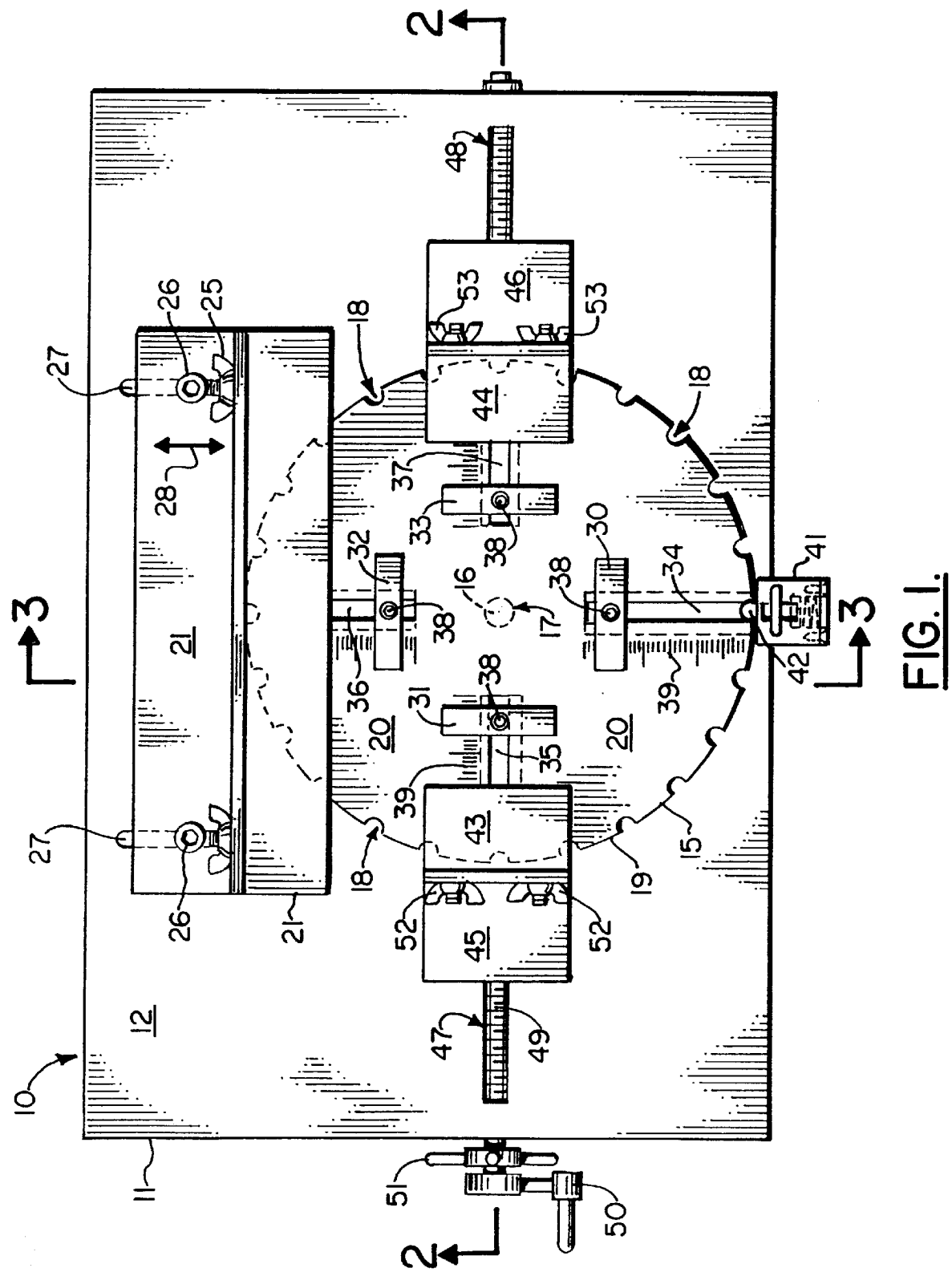
FIG. 1 is a top plan view of the preferred embodiment of the apparatus of the present invention.

FIGS. 1–5 and 8 show generally the preferred embodiment of the apparatus of the present invention designated generally by the numeral 10. Rosette cutting apparatus 10 includes a frame 11 having a work surface 12 thereon. Frame 11 can also provide a plurality of feet 13 for supporting the frame 11 and its work surface 12 above an underlying surface 14 such as a table top, counter or the like.

Turntable 15 is rotatably mounted upon work surface 12. The turntable 15 includes a hub 16 for rotating the turntable upon the frame 11 about the center of rotation 17.

The periphery of table 15 provides a plurality of grooves that are spaced circumferentially about the turntable 15, preferably about 15 degrees apart. Thus, a total of about 24 grooves 18 are provided in the preferred embodiment.

Figure 6:
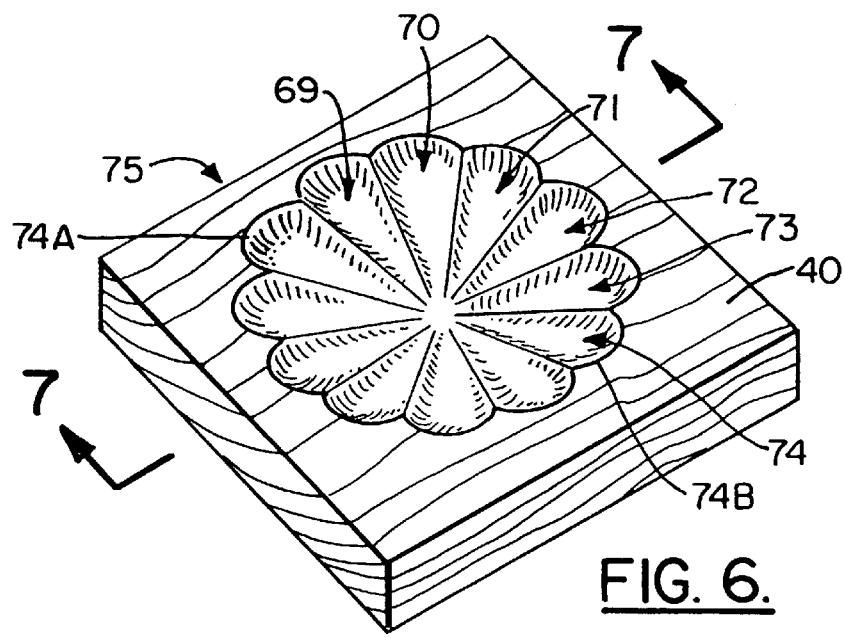
FIG. 6 is a perspective view of a wooden workpiece with the flower or rosette after being cut using the apparatus of the present invention.
Figure 7:
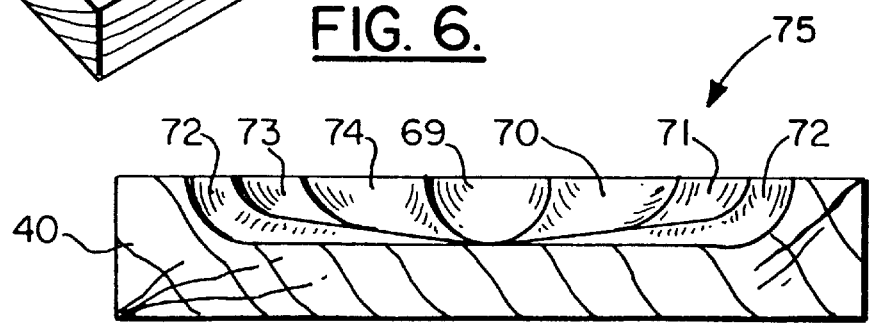
FIG. 7 is a sectional view taken along lines 7—7 of FIG. 6.

Turntable 15 provides an upper surface 20 upon which a workpiece 40 can be placed so that a rosette or flower pattern can be cut therein, the final rosette pattern being shown in FIG. 6. The workpiece 40 can be of wood, particle board, filter board, plastic or synthetics such as Corian®.

A guide arrangement is provided for guiding a router 60 during the cutting of grooves 69–74 in the workpiece 40. The fence 21 includes flanges 22, 23 and beam 24. Bolted connections 25, 26 enable the flanged portions 22, 23 to be moved relative to work surface 12. Similarly, bolted connections 25 enable beam 24 to be moved into different elevational positions relative to work surface 12 as shown by arrow 29 in FIG. 3. Bolted connections 26 secure fence 21 to frame 11 in an adjustable fashion as shown by arrows 28 in FIG. 1. Slots 27 enable bolted connections 26 to pass though frame 11 in FIGS. 1 and 4.

Figure 4:
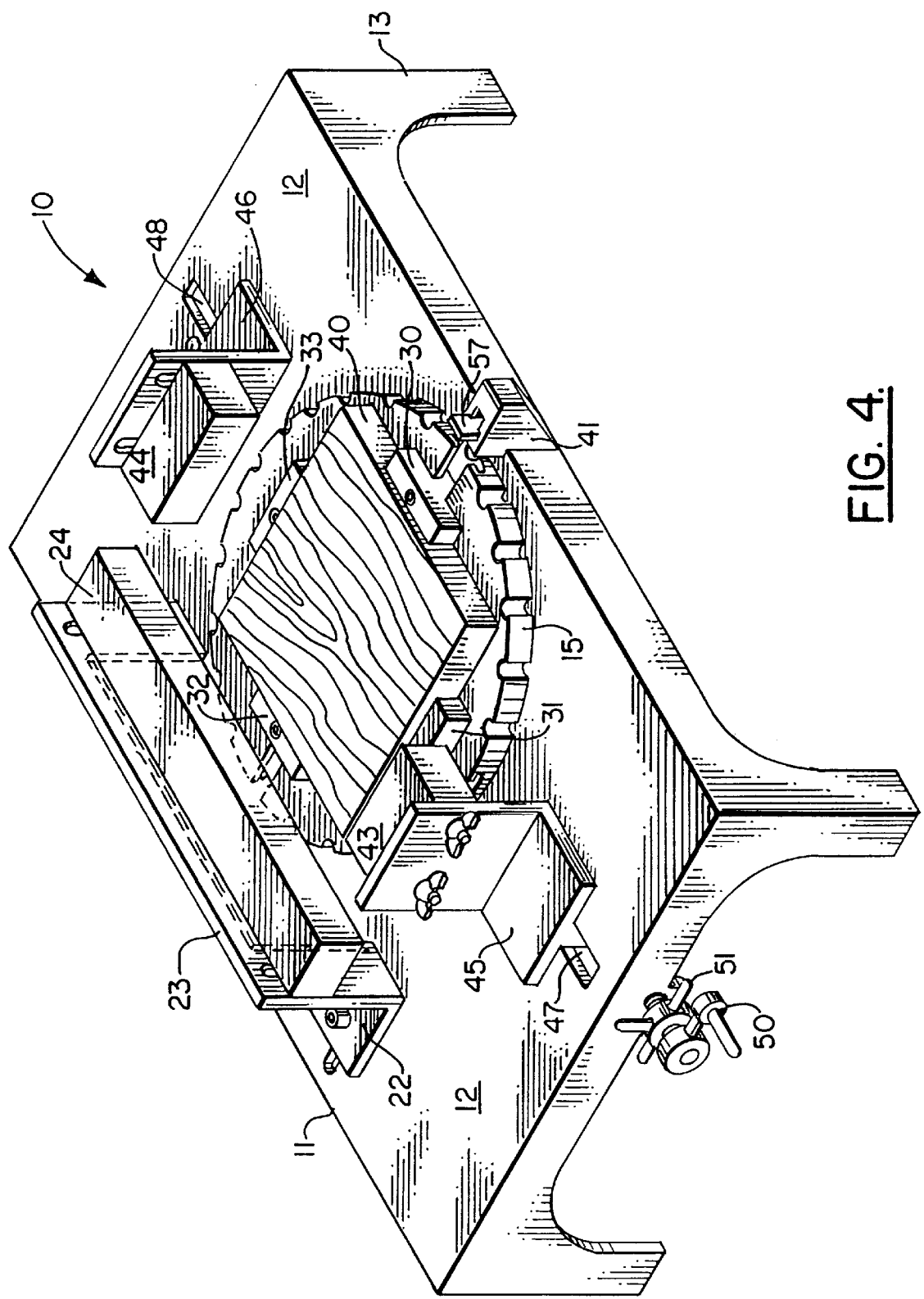
FIG. 4 is a perspective view of the preferred embodiment of the apparatus of the present invention.

A plurality of clamps 30–33 are provided for holding a wooden workpiece 41 as shown in FIGS. 1 and 4. Each of the clamps 30–33 rides in a slot 34–37 respectively, being bolted to frame 11, each clamp 30–33 being attached to frame 11 at bolted connections 38 as shown in FIG. 1.

The turntable 15 is rotatable into different angular orientations relative to work surface 12 using detent locking mechanism 41 having locking pin 42. As shown in FIG. 1, the locking pin 42 registers in a selected of the grooves 18 in order to affix rotation of the turntable 15 relative to work surface 12.

Figure 2:
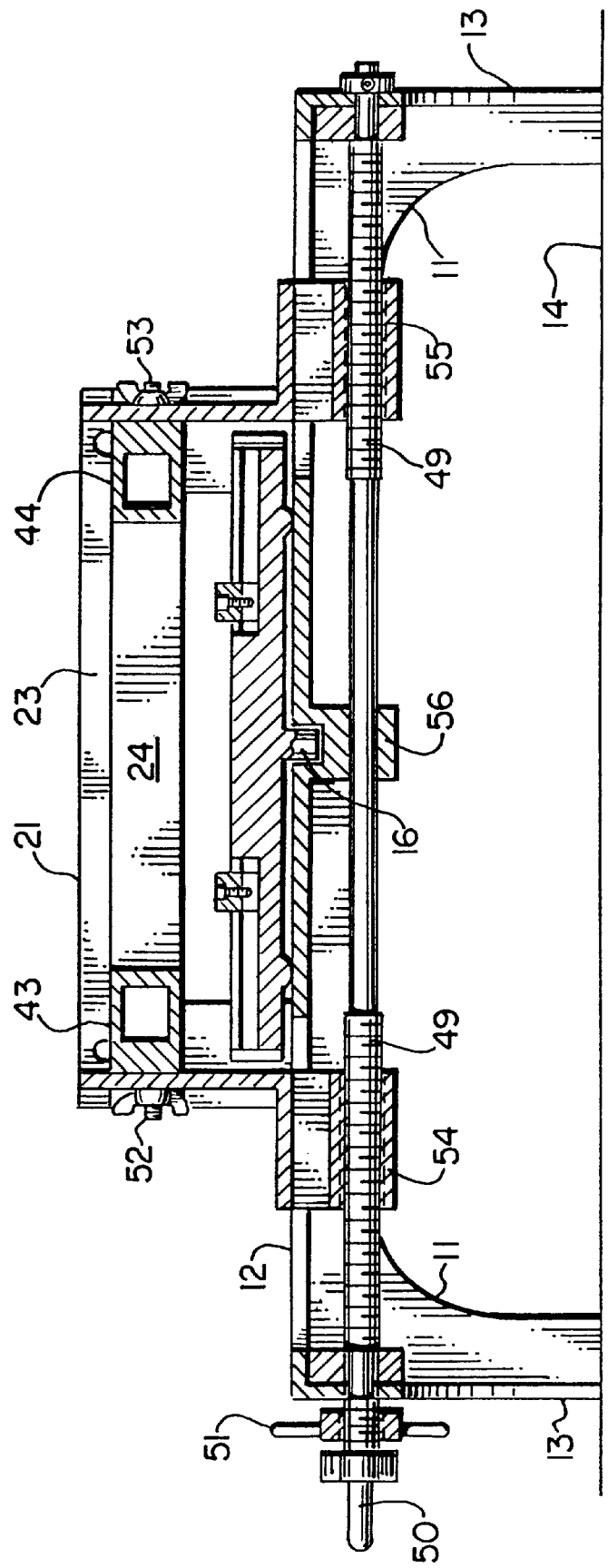
FIG. 2 is a sectional view taken along lines 2—2 of FIG. 1.
Figure 3:
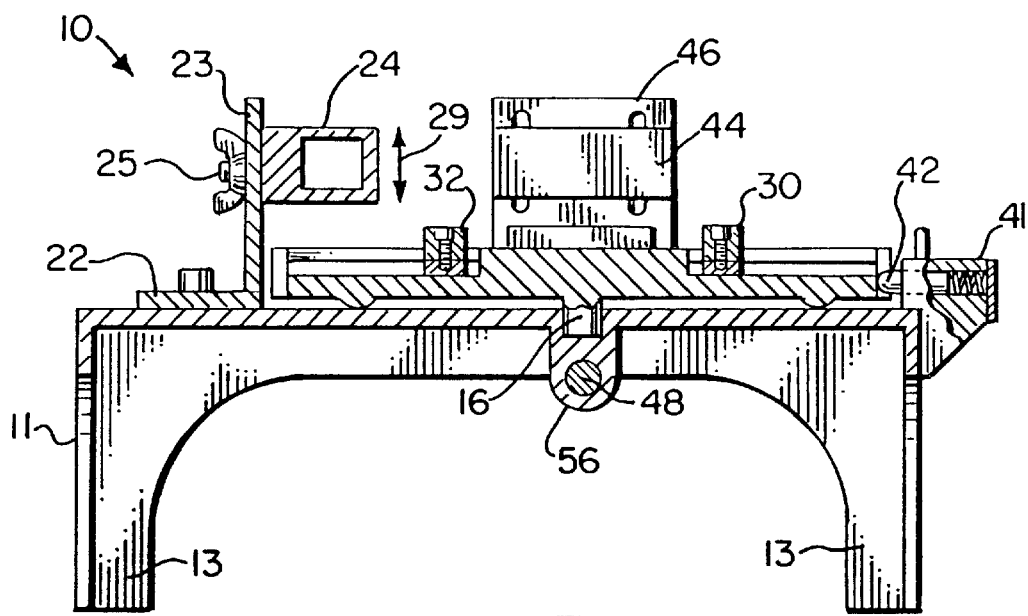
FIG. 3 is a sectional view taken along lines 3—3 of FIG. 1.
Figure 8:
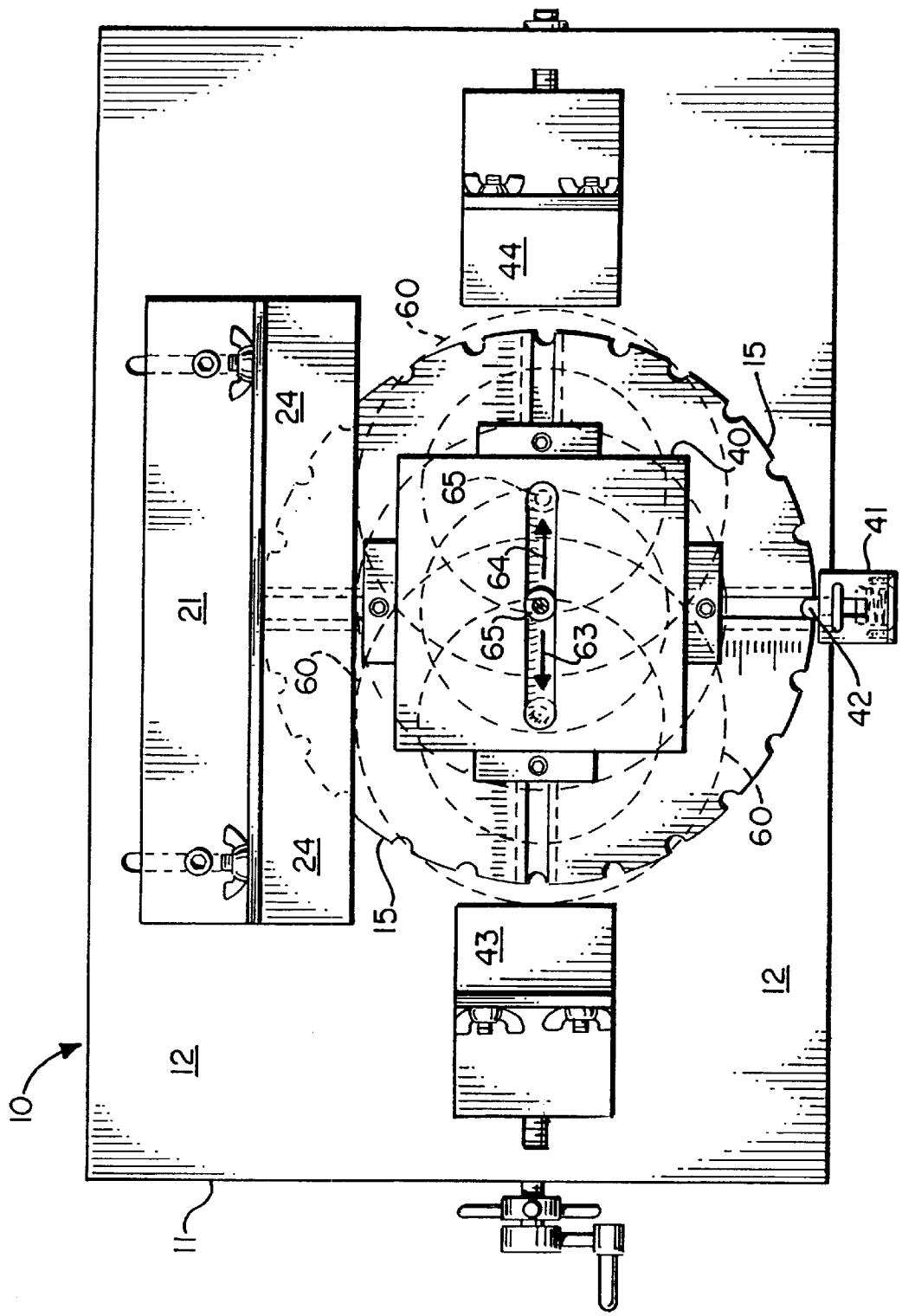
FIG. 8 is a plan view of the preferred embodiment of apparatus of the present invention showing movement of the router relative to the apparatus during the cutting of a double petal of a rosette or flower pattern.

A pair of opposed router stops 43, 44 are used to define the limit of movement of router 60 during the formation of a groove 69 as shown in FIGS. 1 and 8. The router stops 43 and 44 include flanged beam portions 45, 46 respectively that are mounted in slots 47, 48 respectively. Threaded shaft 49 extends under work surface 12 as shown in FIGS. 1, 2 and 3. Thread shaft 49 is rotated with crank 51. The shaft 49 can be affixed in a selected position using lock wheel 51 that is rotated to engage frame 11 so that the crank 50 cannot be rotated to move the shaft 49.

Bolted connections 52, 53 attach each of the stops 43, 44 respectively to their respective flanged beam portions 45, 46 as shown in FIGS. 1, 2 and 4.

Threaded shaft 49 is supported by internally threaded sleeves 54, 55 and shaft support bearing 56. The sleeves 54, 55 are attached to and a part of each of the flanged beams 45, 46 so that when the shaft 49 is rotated, flanged beams 45, 46 move together or apart. This is caused by changing the thread patterns at sleeve 54 and at sleeve 55 so that when the crank 50 is rotated, the flanged beams 45, 46 simultaneously move apart or depending upon the direction of rotation of the shaft 49, move together. This construction enables the user to simultaneously move both of the stops 43, 44 either together or apart at the same speed and to thus define the length of a slot 69 that is to be cut in the workpiece 40.

Figure 5:
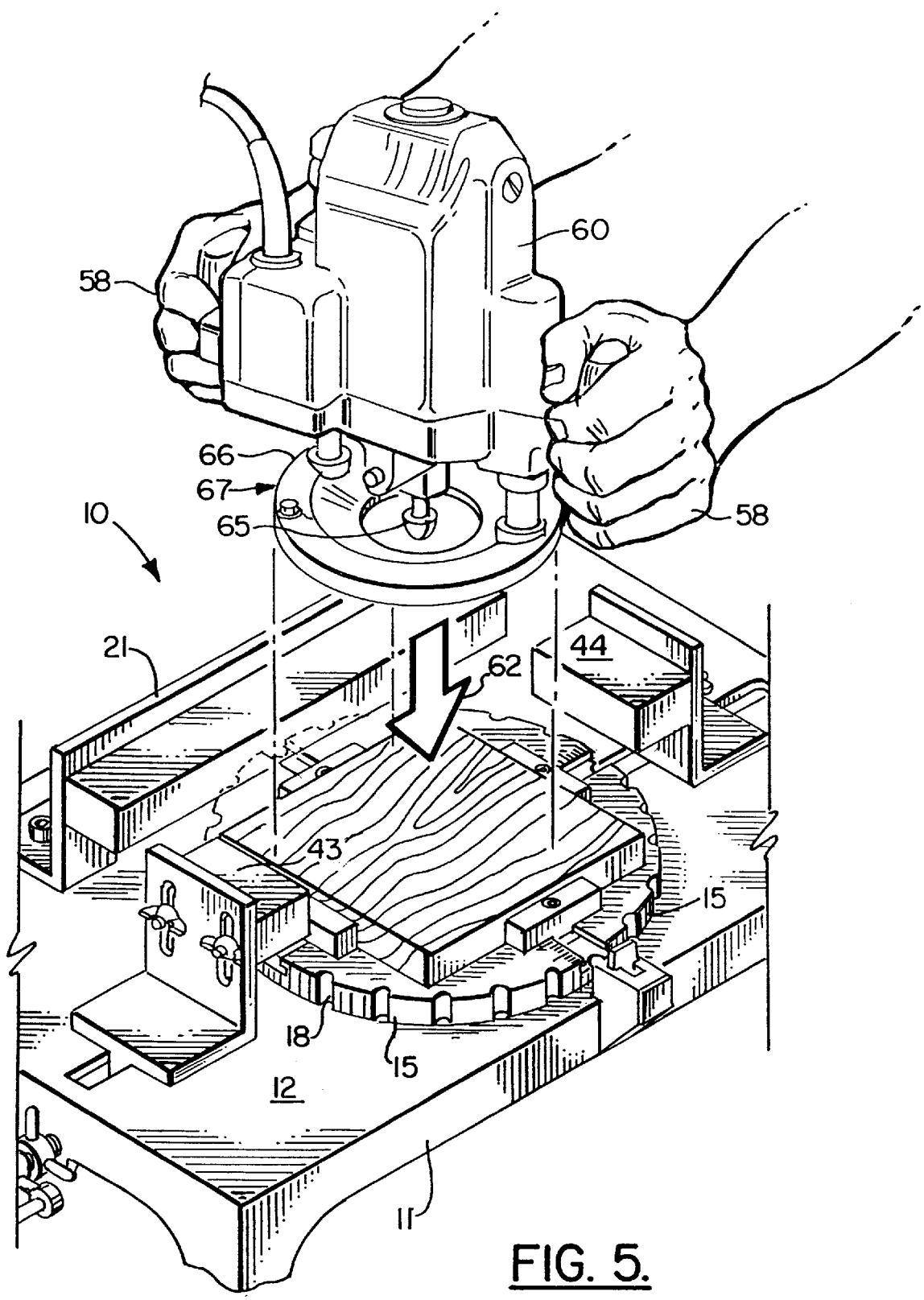
FIG. 5 is a partial perspective view of the preferred embodiment of the apparatus of the present invention showing the attachment of a router to the apparatus prior to cutting the workpiece.
Figure 9:
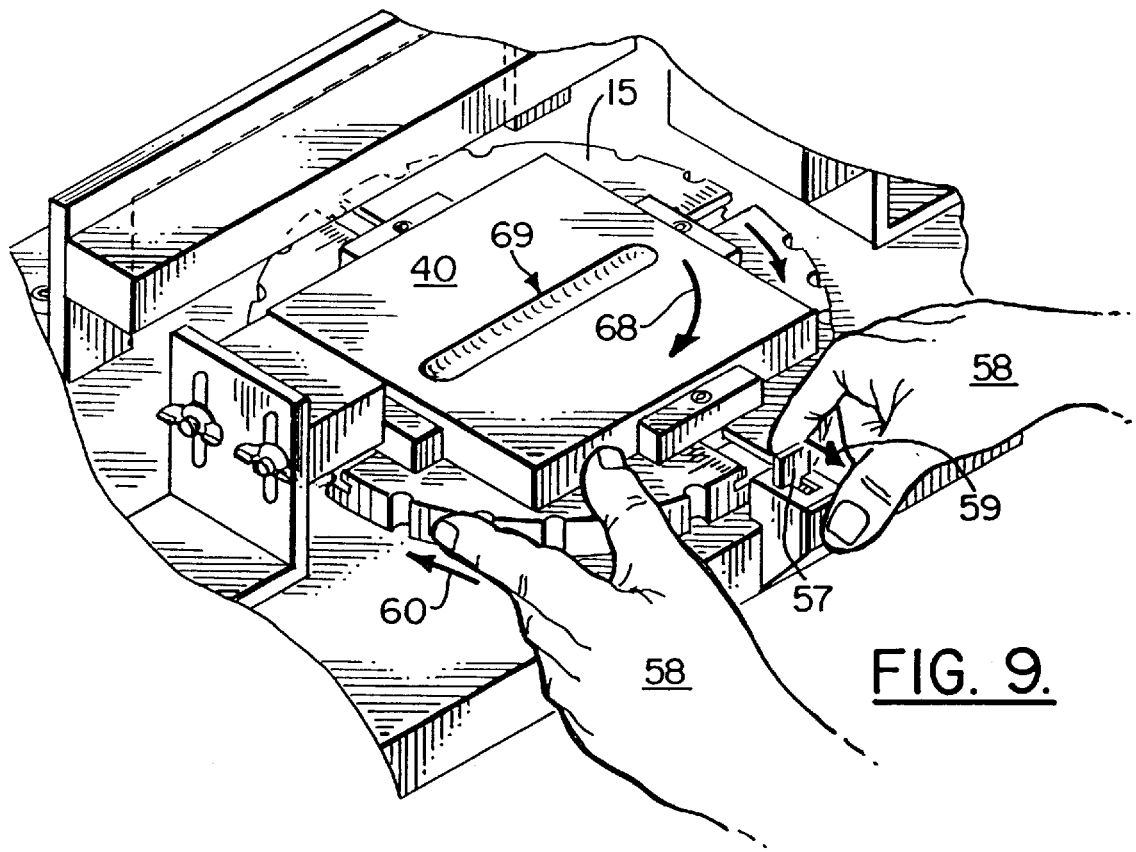
FIG. 9 is perspective fragmentary view of the preferred embodiment of the apparatus of the present invention shown after the formation of one groove of the flower patter in the workpiece.
Figure 10:
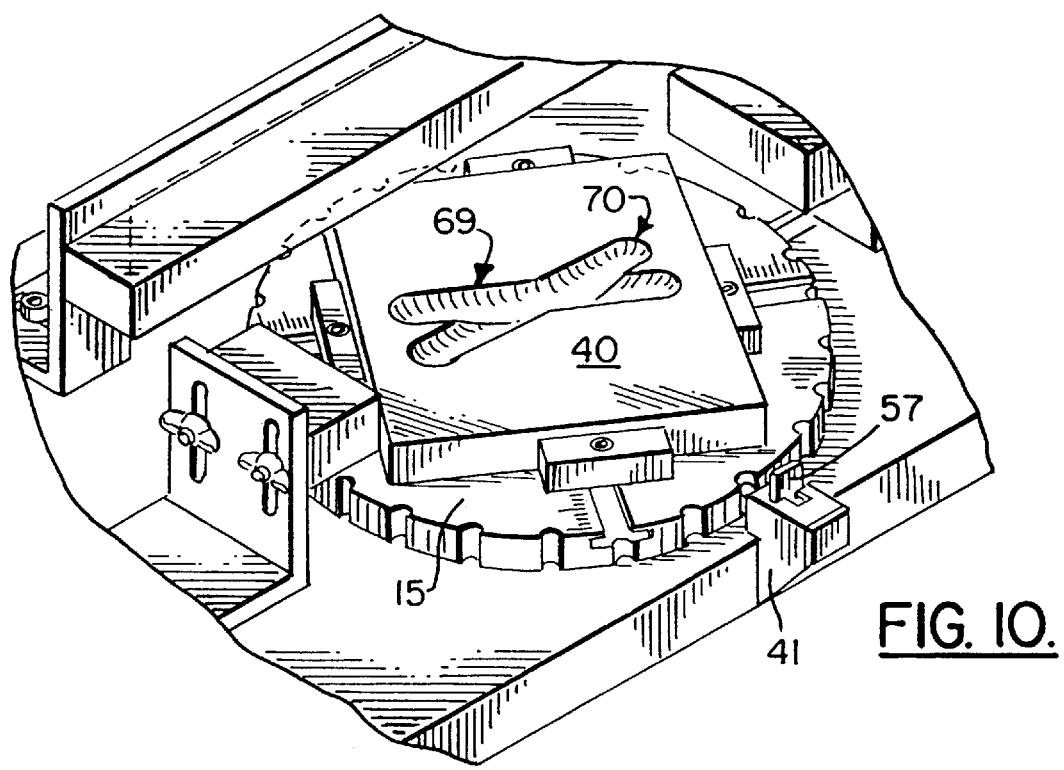
FIG. 10 perspective fragmentary view of the preferred embodiment of the apparatus of the present invention shown after the formation after a second groove of the flower patter in the workpiece.

In order to form a rosette or flower pattern on the workpiece 40, the user first selects and angular position of turntable 15 by locking the detent locking pin 42 into one of the selected grooves 18. As shown in FIG. 5, the router 60 is then lowered by the users hands 58 onto the workpiece 40 as shown by arrow 62. Detent locking mechanism 41 provides a grip 57 that can be moved by the user's hands 58 (see FIG. 9) as indicated arrow 59 after the router 60 has cut a groove such as 69 in FIG. 9. Arrow 68 indicates a rotation of the table 15 into a second angular orientation so that a second groove 70 can be cut as shown in FIG. 10.

In FIG. 8, the router 60 is moved in the direction of arrows 64 and 65 in order to cut an elongated groove 69. The router 60 includes a router blade 65 that can be shaped to provide a desired pattern of the router as cut into the wood workpiece 40. Router 60 also has a router flange 66 with a periphery 67 that engages fence 21 at beam 24 and the stops as shown in FIG. 8. The router 60 is shown in phantom lines in different positions as it moves from left to right in between the stops 43 and 44 which contact the periphery 67 of router flange 66 during cutting. At the same time, the router flange 66 periphery 67 engages beam 24. This construction enables a single cut to be made for forming two simultaneous petals of the rosette design because the router travels fully across the center of rotation 17 of turntable 15. The router blade 65 thus travels to the ends of groove 69 as shown in FIG. 8 indicated by arrows 63 and 64.

In FIG. 6, a completed flower pattern 75 is shown. In FIG. 6, the design has been completed by forming six different cuts indicated by grooves 69–74, each of the grooves forming two petals of the flower pattern. Thus for example the groove 74 includes petals 74A and 74B.

The following table lists the parts numbers and parts descriptions as used herein and in the drawings attached hereto.

PARTS LIST

| Part Number | Description |
| --- | --- |
| 10 | flower like rosette cutting apparatus |
| 11 | fraine |
| 12 | work surface |
| 13 | foot |
| 14 | underlying surface |
| 15 | turn table |
| 16 | hub |
| 17 | center of rotation |
| 18 | groove |
| 19 | periphery |
| 20 | upper surface |
| 21 | fence |
| 23 | flange |
| 24 | beam |
| 25 | bolted connection |
| 26 | bolted connection |
| 27 | slot |
| 28 | arrow |
| 29 | arrow |
| 30 | clamp |
| 31 | clamp |
| 32 | clamp |
| 33 | clamp |
| 34 | slot |
| 35 | slot |
| 36 | slot |
| 37 | slot |
| 38 | bolted connection |
| 39 | scale |
| 40 | workpiece |
| 41 | detent lock |
| 42 | locking pin |
| 43 | router stop |
| 44 | router stop |
| 45 | flanged bean |
| 46 | flanged beam |
| 47 | slot |
| 48 | slot |
| 49 | threaded shaft |
| 50 | crank |
| 51 | lock wheel |
| 52 | bolted connection |
| 53 | bolted connection |
| 54 | internally threaded sleeve |
| 55 | internally threaded sleeve |
| 56 | shaft support bearing |
| 57 | grip |
| 58 | users hand |
| 59 | arrow |
| 60 | arrow |

PARTS LIST

| Part Number | Description |
| --- | --- |
| 61 | arrow |
| 62 | arrow |
| 63 | arrow |
| 64 | arrow |
| 65 | router blade |
| 66 | router flange |
| 67 | periphery |
| 68 | arrow |
| 69 | groove |
| 70 | groove |
| 71 | groove |
| 72 | groove |
| 73 | groove |
| 74 | groove |
| 75 | flower pattern |

The foregoing embodiments are presented by way of example only; the scope of the present invention is to be limited only by the following claimS.

I claim:

1. A router guide apparatus for use in forming rosette designs in a workpiece comprising;
   a) a frame having a work surface;
   b) a wheel rotatably mounted upon the work surface, the wheel having a center of rotation, a periphery, a wheel surface, and a holder for supporting the workpiece on the wheel surface and inside the periphery;
   c) the wheel having a plurality of position stops thereon;
   d) the frame including an adjustable guide for holding and tracking a router with a cutting blade;
   e) the frame including stops for limiting movement of the router during use;
   f) the guide and stops being configured to enable the cutting blade to cut two petals of the rosette in a single pass; and
   g) the wheel being affixable into multiple angular positions relative to the guide so that multiple cuts can be made at different angular orientations relative to one another.

2. The router guide apparatus of claim 1 wherein the position stops include grooves on the wheel.

3. The router guide apparatus of claim 1 wherein the position stops include grooves on the wheel periphery.

4. The router guide apparatus of claim 1 wherein the holder includes multiple vise members on the wheel for holding the workpiece.

5. The router guide apparatus of claim 1 further comprising a lock for holding the wheel in a selected of the position stops.

6. The router guide apparatus of claim 2 further comprising a lock for holding the wheel in a selected of the position stops.

7. The router guide apparatus of claim 3 further comprising a lock for holding the wheel in a selected of the position stops.

8. The router guide apparatus of claim 1 wherein the guides include adjustable stops movably positioned on the frame.

9. A router guide apparatus for use in forming rosette designs in a workpiece comprising;
   a) a frame having a work surface;
   b) a wheel rotatable mounted upon the work surface, the wheel having a center of rotation and a holder for supporting the workpiece;

c) the wheel having a plurality of position stops thereon;

d) the frame including an adjustable guide for holding and tracking a router with a cutting blade;

e) the frame including stops for limiting movement of the router during use;

f) the guide and stops being configured to enable the cutting blade to cut two petals of the rosette in a single pass;

g) the wheel being affixable into multiple annular positions relative to the guide so that multiple cuts can be made at different angular orientations relative to one another;

h) wherein the guide includes a fence that extends along one side of the wheel, offset from the center of rotation of the wheel; and wherein the fence is moveably adjustable relative to the frame.

10. The router guide apparatus of claim 9 wherein the fence is moveably adjustable relative to the frame.

11. The router guide apparatus of claim 10 wherein the fence includes vertically adjustable beam portion.

12. The router guide apparatus of claim 1 wherein there are at least six position stops.

13. The router guide apparatus of claim 1 wherein there are at least twelve position stops.

14. The router guide apparatus of claim 1 wherein there are between six and twenty-four position stops.

15. A router guide apparatus for use in forming rosette designs in a workpiece comprising;

a) a frame having a work surface;

b) a wheel rotatably mounted upon the work surface, the wheel having a center of rotation and a holder for supporting the workpiece;

c) the wheel having a plurality of position stops thereon;

d) the frame including an adjustable guide for holding and tracking a router with a cutting blade;

e) the frame including stops for limiting movement of the router during use;

f) the guide and stops being configured to enable the cutting blade to cut two petals of the rosette in a single pass; and g) the wheel being affixable into multiple angular positions relative to the guide so that multiple cuts can be made at different angular orientations relative to one another; and h) wherein the guide includes opposed stops that are simultaneously moveable toward the wheel.

16. A router guide apparatus for use in forming rosette designs in a workpiece comprising;

a) a frame having a work surface;

b) a wheel rotatably mounted upon the work surface, the wheel having a center of rotation and a holder for supporting the workpiece;

c) the wheel having a plurality of position stops thereon;

d) the frame including an adjustable guide for holding and tracking a router with a cutting blade;

e) the frame including stops for limiting movement of the router during use;

f) the guide and stops being configured to enable the cutting blade to cut two petals of the rosette in a single pass; and g) the wheel being affixable into multiple angular positions relative to the guide so that multiple cuts can be made at different angular orientations relative to one another; and h) wherein the guide includes opposed stops that are simultaneously moveable away from the wheel.

17. A router guide apparatus for use in forming rosette designs in a workpiece comprising;

a) a frame having a work surface;

b) a wheel rotatably mounted upon the work surface, the wheel having a center of rotation and a holder for supporting the workpiece;

c) the wheel having a plurality of position stops thereon;

d) the frame including an adjustable guide for holding and tracking a router with a cutting blade;

e) the frame including stops for limiting movement of the router during use;

f) the guide and stops being configured to enable the cutting blade to cut two petals of the rosette in a single pass; and g) the wheel being affixable into multiple angular positions relative to the guide so that multiple cuts can be made at different angular orientations relative to one another; and h) wherein the wheel carries a plurality of at least two vise members for holding the workpiece.

18. The router guide apparatus of claim 1 wherein the wheel is affixable relative to the frame with a detent locking mechanism.

19. The router guide apparatus of claim 1 further comprising a lock for simultaneously locking both of the stops relative to the frame.

20. A router guide apparatus for use in forming rosette designs in a workpiece comprising;

a) a frame having a work surface;

b) a wheel rotatably mounted upon the work surface, the wheel having a center of rotation, a periphery, a wheel surface, and a holder for supporting the workpiece on the wheel surface and inside the periphery;

c) the wheel having a plurality of position stops thereon;

d) the frame including an adjustable guide for holding and tracking a router with a cutting blade;

e) the frame including stops for limiting movement of the router during use;

f) the guide and stops being configured to enable the cutting blade to cut two petals of the rosette in a single pass; and g) the wheel being affixable into multiple angular positions that are spaced circumferentially apart substantially the same angular degree measurement so that multiple cuts can be made at angular orientations that vary from a first cut by a multiple of the same angular measurement.

21. The router guide apparatus of claim 20 wherein the angular measurement is 15 degrees.

22. The router guide apparatus of claim 20 wherein the position stops are 15 degrees apart.

23. The router guide apparatus of claim 20 wherein the position stops are 30 degrees apart.

24. The router guide apparatus of claim 20 wherein the position stops are 60 degrees apart.

25. The router guide apparatus of claim 1 wherein each stop is positioned on opposite sides of the wheel so that the router blade can cut through the center of the rotation of the wheel and on both sides thereof in a single cut.

26. The router guide apparatus of claim 1 wherein the guide is configured to guide the router to cut grooves in the workpiece that overlap one another.

27. The router guide apparatus of claim 20 wherein the guide is configured to guide the router to cut grooves in the workpiece that overlap one another.

28. A router guide apparatus for use in forming a rosette design in a workpiece using a router with a cutting blade comprising;

a) a frame having a work surface;
  b) a wheel rotatably mounted upon the work surface, the wheel having a center of rotation and a holder for supporting the workpiece;
  c) the wheel having a plurality of position stops thereon;
  d) the frame including an adjustable guide for holding and tracking a router with a cutting blade;
  e) the frame including stops for limiting movement of the router during cutting of the rosette design in the workpiece;
  f) the guide and stops being configured to enable the cutting blade to cut two petals of the rosette in a single pass; and
  g) the wheel being affixable into multiple angular positions relative to the guide so that multiple cuts can be made at different angular orientations relative to one another and the wheel carries multiple vise members for holding the workpiece.

* * * * *